Figure 1:
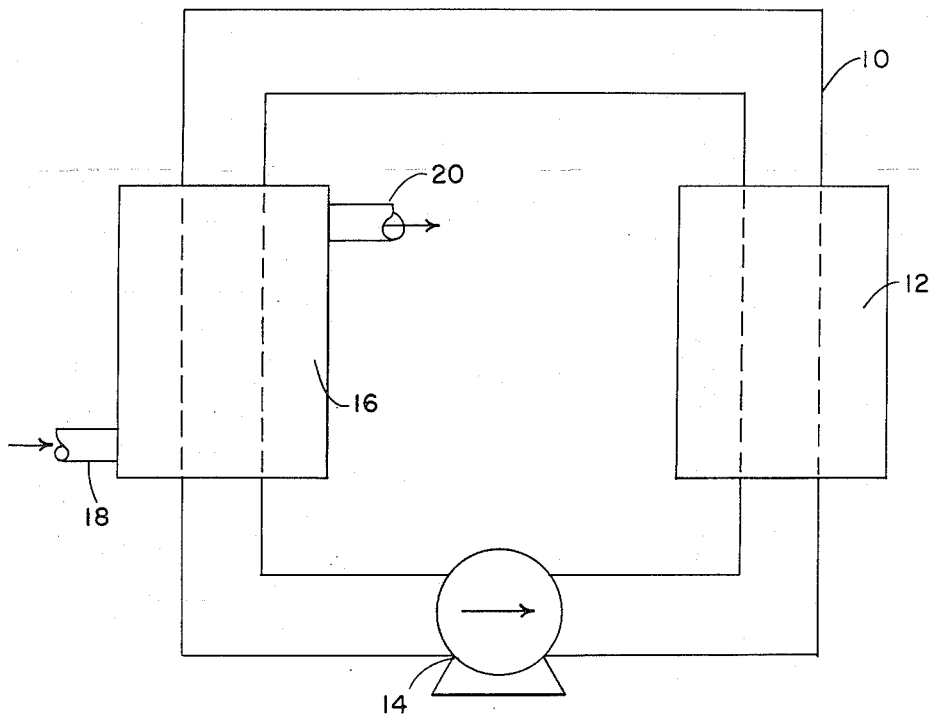

Dec. 16, 1958    D. H. GURINSKY ET AL    2,864,731
FORMING PROTECTIVE FILMS ON METAL

Filed July 13, 1956

DAVID H. GURINSKY
OTTO F. KAMMERER
JEROME SADOFSKY
JOHN R. WEEKS
*INVENTORS*

BY

United States Patent Office 2,864,731
Patented Dec. 16, 1958

2,864,731

FORMING PROTECTIVE FILMS ON METAL

David H. Gurinsky, Center Moriches, Otto F. Kammerer, St. James, Jerome Sadofsky, Patchogue, and John R. Weeks, Port Jefferson, N. Y., assignors to the United States of America as represented by the United States Atomic Energy Commission Application July 13, 1956, Serial No. 597,828

19 Claims. (Cl. 148—6.11)

The present invention relates to a method of inhibiting the attack of metal surfaces by corrosive liquid metals in contact therewith and to metal container systems, the surfaces of which have corrosion-inhibiting layers formed thereon.

One of the materials which has been found highly efficient in transferring heat within a power generation heat transfer apparatus is a liquid metal. The metals which are suitable for this purpose should preferably have low melting points. A number of the high-density, low-melting metals are particularly useful in this connection because of the wide temperature spread between the melting and boiling points. Bismuth for example, melts at 271° C. and boils at about 1470° C. Gallium melts at about 30° C. and boils at about 2000° C. Although such metals are normally relatively unreactive with metal containers at low temperatures, when used in power generation heat transfer apparatus their temperatures must be raised to 500° C. and above and, as the liquid metal temperature is increased, they display an increased tendency to attack, by corrosion, dissolution or other modes, the metals which they contact. Operation at higher temperatures is preferred because greater efficiency of power generation is achieved at such temperatures. Accordingly one of the objects of the present invention is to inhibit the attack of certain metal surfaces by heavy, liquid-metal media brought into contact therewith at high temperatures.

When liquid metals are used as carrying media for fissionable or fertile materials, and the compositions are subjected to neutron irradiation, there is a tendency for the radiation products formed in the liquid metal to react with the metal surfaces contacted by the liquid composition. It is another object of the present invention to provide a method of protecting metal surfaces against reaction with radiation products formed in liquid-metal carrying media.

One metal which has been found to have particularly desirable properties in connection with the generation of and transfer of heat in and from a nuclear reactor, is bismuth. Bismuth has a low capture cross section for neutrons, a low melting point, a relatively high thermal conductivity and specific heat, a low viscosity at elevated temperature, an appreciable solubility for uranium and a number of other properties which make it particularly useful in this connection, such as that pointed out above. Metals and metal compositions such as lead, and lead-bismuth compositions, having similar combinations of properties, are also particularly useful in connection with nuclear reactor heat generation or transfer.

Although there are some structural metals which are not dissolved or otherwise attacked by liquids such as bismuth, or compositions containing a large fraction of heavy liquid metals at relatively high temperature, there are few of the structural metals which have other requisite properties for use in making the component parts of nuclear reactors or heat transfer apparatus to contain these compositions at high temperature. Some properties which are desired in a metal to make it useful in containing heavy liquid metal compositions at elevated temperatures, are ease of fabrication, ease of welding, structural strength at temperature, resistance to corrosion by air at the elevated temperature and relatively low neutron capture cross section. Such metals as may be found to have the desired combination of properties are prohibitively expensive for fabrication into the large scale apparatus needed.

Certain steels available in commerce could be used advantageously in providing containers for liquid bismuth or other heavy diquid metal compositions at elevated temperature if they were not corrosively attacked or dissolved by these liquids. An additional object of the present invention is to render feasible the use of steels available in commerce and to provide steels of modified composition for containing heavy, liquid-metal compositions at elevated temperature. An additional problem which has been encountered in the operation of heat transfer systems containing heavy, liquid-metal compositions is the tendency of some container metals to be dissolved in a higher temperature region of the system and to be precipitated in the lower temperature regions, where the liquid composition is circulated through these regions. This combination of dissolving and precipitating actions results not only in the penetration of the container wall in the hot portion of the flow system, but also in blocking the flow system by deposit of metal in the cooler sections. It is a further object of the present invention to provide a method of inhibiting the solution and precipitation, or mass transfer, of metal between portions of the heat transfer system. Another object is to inhibit the solution of metal of the container wall by heavy, liquid-metal compositions.

A further object of the invention is to form highly stable nitride films on metal surfaces and thereby to provide metal container systems resistant to attack by liquid metals in contact therewith.

In one of its broader aspects the objects of the invention are achieved by bringing nitrogen and at least one metal selected from the group consisting of zirconium, titanium and hafnium into reactive contact at the surface of the metal to be protected to form an adherent layer of the nitride of said selected metals at the surface of said protected metal. Advantageously the concentration of nitrogen and selected metal at the surface to be protected should be high, as layers of sufficient thickness to afford protection are formed more rapidly from higher concentrations of these reactants. The subject method contemplates providing a relatively high concentration of nitrogen in a form which is available for reaction at the surface to be protected and bringing one of the selected metals into contact with this surface at an elevated temperature to form an adherent, protective metal nitride layer.

Certain metals form nitrides of greater or lesser stability. It has been found that the nitrides of the selected metals are of greater stability than those of the principal components of most common structural metals. According to one mode of practicing the invention a metal specimen is prepared having a relatively high concentration of metal nitride, the stability of which is lower than the stability of zirconium, titanium or hafnium nitrides; the metal is heated to make the nitrogen available for reaction at the metal surface; and said surface is contacted with a carrying medium containing titanium, zirconium or hafnium metal to form an adherent layer of the nitride thereof at said surface.

It is known, as is pointed out above, that the increase of the temperature of the metal contacted by the liquid metal increases the attack of this metal. For this reason it has been the practice in using heavy liquid metals in contact with container metals to restrict the temperature of systems containing liquid metals to those at which the attack is very slow. Contrary to this previous practice the subject method is practiced, in one of its broader aspects, by increasing the temperature of contact to that at which the attack is fast. It has been found for numerous metal nitrides in metal media, that at the higher temperature, the rate of diffusion of nitrogen in the metal increases at a rate which is faster than the rate of increase of attack of the metal. Thus it has been found possible by increasing the temperature of the nitride-containing metal to increase the rate of dissociation of nitride and to increase the rate of diffusion of nitrogen therein while the metal surface is in contact with a source of zirconium.

Higher temperatures are preferably employed in forming protective layers on metals containing alloy components which form relatively more stable nitrides. This is particularly true in alloy steels where the concentration of nitrogen in the steel is stochiometrically less than that required to completely nitride these alloy components.

Where higher temperatures are employed to increase the diffusion of nitrogen in the metal, it is also preferred to employ less corrosive liquid metal media containing zirconium to minimize the corrosion during the period when the protective layer is being formed. Preferably also, during this period, a high concentration of the selected metals, zirconium, titanium, or hafnium, should be present in the liquid metal carrying medium contracting the metal to minimize corrosion. A saturated solution of the selected metal may be employed for this purpose.

Where stable-nitride-forming alloy metals are present, the nitrogen content of the metal is preferably increased to permit formation of nitride at lower temperatures. Where the metal to be protected contains alloy metals which form less stable nitrides, the carrying medium may be that against which protection is to be afforded as this metal is sure to wet and thus form an intimate contact at the liquid-solid interface.

It is thus contemplated within the scope of the subject method to increase the available nitrogen content of the common structural metals to be protected, above their normal nitrogen content and thereafter to contact said metal at an elevated temperature with a liquid-metal composition containing a stable-nitride-forming metal disposed therein.

In general, the degree of protection from attack by liquid metal decreases with increasing temperature and with temperature differential in the hot and cold regions of a circulation system. It is therefore preferable to use the protected metal within a range between the temperature at which the heat transfer metal liquefies and that at which rate of attack shortens the useful life of the container. Some inhibition, however, is afforded to structural metals though the use of the subject method at all temperatures below the temperatures at which structural properties of a container metal itself are impaired. In steels suitable for use at high temperatures, protection is afforded to permit useful heat transfer to be accomplished to temperatures in the range up to 1200° F. Where high temperature use is contemplated it is preferable to increase both the nitrogen content of the container metal and the selected metal concentration in the heavy liquid metal.

In order to ensure adequate protection at operating temperatures, a layer is formed at a temperature above the highest at which the operating protection is to be afforded. It has been found that sufficient thickness of protective layer can be formed during a high temperature conditioning period without significant loss of metal during this period. An adequate concentration of zirconium must be maintained in the liquid metal composition at the higher temperatures in order to ensure the formation of the protective nitride layer and should in no event be allowed to fall below 0.5 part per million. Where avoidance of any appreciable attack of the container metal surface due to high temperature pretreatment is desired, it is possible to form thicker and accordingly more protective layers by longer periods of pretreatment at lower temperature. For example, in a steel system containing adequate available zirconium in the liquid and adequate available nitrogen in the container metal, a nitride layer of approximately one half micron may be formed in one hundred hours at a temperature of about 550° C. This layer will increase to about one and one-half microns in 1000 hours and to about three microns in 3600 hours.

It is contemplated within the scope of the subject method to treat the surface of a metal to be protected with a relatively less corrosive liquid metal composition containing a relatively high concentration of zirconium, titanium or hafnium at an elevated temperature above that at which the surface is later to be used, to form on the treated surface a protective layer of nitride whereby said treated metal can be used in contact with a more corrosive liquid metal. This protection may be attained with respect to a number of liquid metals because the protection afforded depends primarily on the presence of the stable nitride layer on the structural metal surface and not on some interaction of liquid metal and surface.

The nitride layer has been found to effectively prevent reaction of substances dissolved in the liquid metal with the container metal. For example in the case of a solution of uranium in bismuth, there is no appreciable loss of uranium from solution when it is introduced into a bismuth solution of zirconium and magnesium in a steel system.

One feature which makes the subject method particularly advantageous in connection with providing a continuous protection against attack of the structural metal surface is the possibility of continuously forming nitride on freshly exposed surface of a metal to be protected, for example in cases where erosion is of importance. Thus for example if a heavy liquid metal composition having at least 0.5 part per million of zirconium dissolved therein is maintained in a metal container, and the amount of available nitrogen is maintained at a high level in the container metal, fresh container metal surface exposed due to a crack or fissure which develops in the container surface film, will be protected from attack by the liquid metal by the formation of a new nitride layer on the newly exposed surface. The subject method contemplates the continuous protection of a container metal surface from attack by liquid metal solutions by the initial formation of a protective layer and thereafter by maintaining in said solution a concentration of at least 0.5 part per million total of at least one of the metals of the group consisting of zirconium, titanium and hafnium and maintaining in said container metal a concentration of nitrogen available to form the protective nitride metal layer at the surface of the container. This nitrogen may either be dissolved in the container metal itself or be in the form of a nitride of a component metal of the container which is less stable than the protective nitride to be formed on the surface of the metal.

The metal composition against which protection may be afforded by the subject invention are the individual metals or combinations of metals which individually melt below 650° C. and have a density in excess of 5. These metals include: zinc, cadmium, mercury, gallium, indium, thallium, tin, lead, bismuth and antimony and alloys containing these metals as their principal ingredients.

A number of procedures are encompassed within the scope of the present invention to ensure presence of available nitrogen at the container metal surface. By available nitrogen is meant nitrogen which is present in the metal to be protected in a form which makes possible the reaction of the nitrogen and the selected metal at the surface of the metal to be protected. Where such nitrogen is present in the form of nitrides, at least one of said nitrides should be less stable than the nitride of the metal nitride to be formed at the metal surface at the temperature of formation.

One such procedure involves adding nitrogen to the structural metal, the surface of which is to be protected, when this metal is initially formed. In the case of steel, nitrogen is normally present to the extent of .003 to .03%. It has been found that certain alloy elements may be included in the steel to ensure the presence of a relatively high percentage of nitrogen in a form available for protective nitride formation. Silicon, chromium, aluminum, vanadium and iron form nitrides which are less stable than the protective nitrides of zirconium, titanium and hafnium. It is known that in certain steels, the presence of an excess of nitrogen in an uncombined form may affect the structural and other properties of the steel. The subject method contemplates the increase in the nitrogen content without adversely affecting the properties of the steel, as a container for liquid metals, by the addition of alloying components which form nitrides less stable than those of the selected metals.

Where the nitrogen-dependent properties are important to the use of a container metal, the nitrogen addition may be limited to the surface at which the protective layer is to be formed. On the other hand where a constituent is added which permits the nitrogen to be retained in the metal in a form which does not adversely affect the structural properties of the container metal, the nitrogen may be derived in reactive form on heating. For example, a relatively high percentage of aluminum in the order of 0.04% may be added to certain steels to retain a higher percentage of nitrogen than is normally found in such steels. Protection is afforded to the steel surface by contacting the surface with a heavy liquid metal composition containing a stable-nitride-forming metal such as zirconium, titanium and hafnium. Because of the stability of aluminum nitride a high temperature and high concentration of zirconium, preferably a saturated solution of zirconium, should be employed until an adequate nitride layer is formed. In some cases, it may be necessary to maintain a lower concentration of the selected metals, such as a concentration of the order of 50 parts per million in contact with the steel.

Other metals forming less stable nitrides may be added to the steels in addition to the aluminum as a source of nitrogen. In a steel containing 0.02% aluminum, a small percentage of chromium of the order of 1%, with the remainder essentially iron, it has been found that a stabilizing nitride layer can be formed on the surface of the steel by subjecting this metal to the action of a heavy liquid metal containing zirconium or titanium at a temperature above 500° C. Higher temperatures may be employed for the stable nitride forming step, because, as noted above, the rate of formation of a protective layer or the thickness of the layer formed during a conditioning period may be increased in this way.

Where the properties affected by nitrogen are not important to the use of the container metal, excess nitrogen may advantageously be incorporated in the steel. One method which has been successfully used in forming protective nitride coatings on steels involves exposing the metal to a source of reactive nitrogen at a relatively high temperature in the order of 1000 to 1200° F. and thereafter contacting this surface at an elevated temperature with one of the selected metals. Cracked ammonia is one substance which has been found very effective in introducing nitrogen into the surface of the metal to be protected. Other nitriding agents for increasing the amount of available nitrogen at the surface of the metal to be protected may also be employed.

Contact may be made between the nitrogen-containing surface and the stable-nitride-forming metal with the aid of a liquid-metal carrying medium. The liquid metal composition against which protection is to be afforded has proved to be a useful carrying medium for supplying the stable-nitride-forming metal to the container surface because, as noted above, good contact at the solid liquid interface is assured.

Other carrying media for introducing necessary zirconium or other stable-nitride-forming metal onto the surface of the metal to be protected should preferably be capable of providing the zirconium at the metal surface as the metal. For example, liquid salt compositions may be employed to supply the zirconium electrolytically to the metal surface to be protected.

A protective layer may also be formed by disposing a layer of one of the stable-nitride-forming metals on the surface to be protected and forming the nitride thereof by treatment of the deposit with a nitride-forming composition. For example, zirconium can be deposited on a metal such as copper and the protective nitride formed by passing cracked ammonia over the surface thereof while the surface is maintained at an elevated temperature in the order of 1000° C. Such deposit of stable-nitride-forming metal may be accomplished electrolytically from fused salt baths, by sputtering or other known methods. The formation of an intermetallic surface layer of the protected and protective metals, by heat treatment or other means enhances the adherence and protectivity of the formed nitride layer.

Although the nitrogen should preferably be present in the metal surface when it is contacted by the carrying medium containing the stable-nitride-forming metal, in order to minimize the attack on the container metal surface, it is also possible to bring this nitrogen to the solid-liquid interface to form a protective layer after the contact has been made because of the relatively rapid diffusion of nitrogen. Nitrogen diffuses rapidly at temperatures of about 500° C. and above. It is thus possible to form the protective layer by maintaining a liquid metal composition containing at least 0.5 part per million of at least one metal selected from the group consisting of Zr, Ti and Hf, in contact with a surface of a steel element to be protected at a relatively high temperature, and maintaining the opposite side of the element in contact with a source of nitrogen to introduce nitrogen into the element. The nitrogen applied in this manner diffuses through the metal to the surface in contact with the liquid metal to form the protective nitride at the interface.

The foregoing are a number of the preferred methods for forming stable nitrides at the surfaces of the metals to be protected. However we have discovered that the protection is afforded by an adherent, stable-nitride layer without regard to the method of its formation. Greater protection is afforded by the more adherent layers formed by increasing the amount of available nitrogen at the surface to be protected, the concentration of selected metal, and the temperature. Containers having protective layers in excess of 0.5 micron are contemplated within the scope of the subject invention. The term containers in this context is meant to include any metal member protected on its surface to prevent the passage of fluid therethrough. For example a zirconium tube having a protective nitride layer on its internal and external surface for use in a heat exchanger to transmit heat from heavy liquid metal outside the tube to a second heavy liquid metal inside the tube is deemed to be a container with respect to the metal outside as well as inside the tube.

Figure 2:
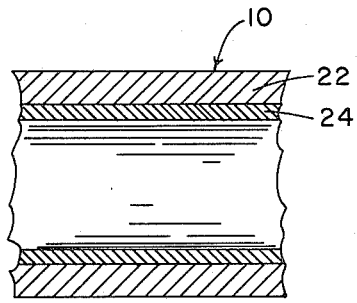

The invention is illustrated in the accompanying figures in which:

Figure 1 is a diagrammatic illustration of a container for a liquid metal in which there is a hot zone and a cool zone; and Figure 2 is a diagrammatic illustration of a portion of a container illustrating the surface film formed in accordance with this invention.

In Figure 1 there is shown a container in which a heavy liquid metal is circulated between a hot and a cold zone. In Figure 1 the container, indicated by reference number 10, is shown in the form of a closed loop of pipe. In one leg of the loop, the pipe is heated by a heat source 12 which may be a furnace of the electric induction type, a gas-fired furnace, a nuclear reactor or a heat exchanger having a pass through which a hot fluid flows in heat transfer relation to the loop. In another leg of the loop the container is cooled by means of a cooling jacket or heat exchanger 16 about the container. The cooling jacket has an inlet 18 and an outlet 20 for the coolant. A high temperature zone is defined by the heat source and that portion of the container 10 including the heat source 12 leading from heat source 12 to jacket 16. A pump 14 in the loop downstream of the cooling jacket 16 and upstream of the heat source 12 serves to circulate the liquid metal. Alternatively, the liquid metal may be circulated by convection.

In Figure 2 a portion of the container 10 is illustrated. The container 10 has a wall 22 formed of steel, for example, or of the other alloys referred to herein. On the surface of the wall 22 in contact with the liquid metal there is a thin layer 24 of nitride of a metal selected from the group consisting of zirconium, titanium or hafnium. The relative dimensions of the layer and wall are exaggerated in the drawing for clarity of illustration.

The following examples are illustrative of the present method although it will be understood that the scope of the invention is not restricted to the procedures illustratively described. In carrying out the procedures detailed in these examples known metallurgical and chemical techniques for purifying, testing and examining the specimens treated as described were employed. Such procedures as those described in the article entitled "Corrosion Problems With Bismuth Uranium Fuels" published in volume 9 of the Proceedings of the International Conference on the Peaceful Uses of Atomic Energy at page 341, were employed. However it will be understood that numerous other procedures for controlling the concentration, introduction and removal of ingredients and purification thereof may be employed. All percentages given in these examples are by weight.

EXAMPLE I

A sample of a SAE 1020 steel was dipped into purified bismuth containing 0.3% zirconium at 750° C. for 118 hours. Metallographic and visual examination of this rod indicated its surface to be free from corrosion and to be greyish in appearance. X-ray refraction measurement indicated that a deposit of ZrN had formed.

EXAMPLE II

A rod of SAE 1020 steel was dipped into purified bismuth containing 0.3% titanium for 96 hours at 760° C. After removal from the bath the rod exhibited a wetted coat of bismuth. This coat was removed by successive dips in a 180° C. mercury bath. No surface corrosion was apparent on visual or metallographic examination. X-ray diffraction examination indicated that the steel was coated by a solid solution of TiN-TiC.

EXAMPLE III

A sample of SAE 1020 steel and a sample of 347 stainless steel was immersed in a bismuth circulation system where they were subjected to the action of flowing liquid bismuth containing zirconium dissolved therein to the extent of about 0.015%. The bismuth flow rate was maintained at approximately one foot per minute for a period of about 7200 hours. The average temperature of the samples was about 500° C. during this period. At the end of this time the samples were removed from the system and examined metallographically. A layer of adherent zirconium nitride was found on the surface of the steel. This sample was also found to be completely free from corrosion. The sample of 347 stainless was also examined metallographically and was found to have undergone extensive transgranular attack.

The nitrogen in the 347 stainless steel is in the form of columbium nitride, the stability of which is nearly as great as the stability of the nitrides of zirconium, titanium and hafnium. The nitrogen in the SAE 1020 steel is in a form substantially less stable than the nitrides of zirconium, titanium and hafnium and thus available to the formation of these stable protective nitrides at the solid liquid interface at the temperature employed.

Mercury is another of the high density, low melting metals which has desirable heat transfer characteristics for use in heat transfer apparatus. The use of this metal in such apparatus has been limited because of its corrosive attack on certain container metal materials particularly certain steels. According to the subject invention this attack may be limited or inhibited by the treatment of the metal surface to be contacted to increase its available nitrogen content and by treatment of this surface with a heavy liquid metal containing a stable-nitride-forming metal dissolved therein.

EXAMPLE IV

A sample of SAE 1020 steel was contacted with a bath of 215 grams of mercury containing 0.2 gram of titanium and 0.010 gram of magnesium at a temperature of 740° C. for a period of 120 hours. Visual and metallographic examination revealed that a layer had formed on the surface and that no corrosion had occurred. X-ray diffraction revealed the presence of two separate compounds, TiN and TiC.

EXAMPLE V

Twelve sample rods of 2¼ croloy steel were placed in solutions of 0.1 gram of uranium in 100 grams of bismuth in separate graphite crucibles. Half of the solutions contained zirconium and magnesium in amounts of 0.035 gram and 0.025 gram respectively. The other half contained only the stated amount of uranium in bismuth. Two crucibles containing uranium-bismuth were heated to 550° C. Four similar samples were heated to 650° C. and the remaining four to 750° C. The samples were maintained at this temperature for 300 hours after which they were removed from the baths and cooled.

Bismuth clinging to the specimens was removed by successive immersions in a mercury bath at 150° C. The samples were then examined metallographically. With regard to the samples heated to 750° C., those immersed in the bath containing magnesium and zirconium exhibited no corrosion whereas those maintained in the bath containing no magnesium or zirconium showed extensive intergranular corrosion averaging over 0.004 inch. X-ray diffraction examination revealed that a layer of zirconium nitride existed on the samples withdrawn from the baths containing zirconium. The samples heated to 650° C. and 550° C. were similar.

Similar samples of croloy 2¼ were immersed in similar zirconium-free and zirconium-containing bismuth solutions in a closed circulation system or loop in which the liquid bismuth solution was maintained in flowing contact with the specimen studied. A temperature of 550° C. was maintained. No corrosion was found in the specimen exposed to the bismuth solution which contained zirconium but an intergranular attack greater than 0.004 inch was found in those samples which contained no zirconium in the bismuth.

EXAMPLE VI

A sample of steel drill rod containing 1.1% carbon and about 0.04% aluminum was immersed in a purified bismuth solution containing 0.3% zirconium and 0.05% magnesium for 96 hours at 760° C. At the end of this period the sample was removed, cleaned by repeated immersion in mercury at about 150° C. and examined metallographically and with X-ray refraction techniques. No surface deposit was found. The surface was observed to be tarnished but to have undergone no attack.

EXAMPLE VII

A sample of 2¼ croloy steel was immersed in a purified liquid bismuth bath containing 0.3% zirconium for a period of 120 hours at a temperature of 750° C. At the end of this period, the sample was cooled, removed from the bath, cleaned by repeated immersion in mercury at 150° C. and examined metallographically by X-ray techniques. It was found that a layer of zirconium nitride had formed on its surface; the surface was greyish in appearance, and the sample had undergone no attack.

A similar sample was immersed in a purified liquid bismuth bath containing 0.1% zirconium at 650° C. for the same period of time. A relatively weak indication of the presence of zirconium nitride on the metal surface was found on X-ray examination. The surface was not bronzed in appearance but was not attacked. This example demonstrates that for samples containing relatively stable-nitride forming alloy metals (in this case chromium) lowering the temperature of treatment results in the formation of thinner protective layers for the same period of treatment.

A similar sample was immersed in a purified bismuth bath containing 0.025% zirconium and 0.1% magnesium. The bath was maintained at a temperature of 550° C. for 3000 hours. On visual examination, the surface appeared bronzed. It was not attacked and a layer of zirconium nitride having a thickness of 3 microns was found. This sample demonstrates that for metals containing stable-nitride-forming alloy metals it is possible to form the necessary protective layer by subjecting the sample to treatment at lower temperatures but for longer periods of time.

The following examples are illustrative of the difference in results obtained when the nitride is present and not present on the metal surface in a form which inhibits attack of the metal surface.

EXAMPLE VIII

The rate of solution of iron from pure iron and from steels into liquid bismuth containing zirconium and/or magnesium additives was measured by equilibrating a crucible of the metal to be investigated with 300 to 500 grams of purified bismuth contained in the crucible. The bismuth contained the desired additives and was first maintained for 24 to 72 hours at 425° C. The liquid metal was then sampled as and after the temperature was raised to 615° C. A series of liquid metal samples were taken as the crucible and liquid were equilibrating to the higher temperature.

It was found that in pure bismuth, iron dissolves at a rate which corresponds roughly to the rate at which the temperature is raised. The presence of magnesium and zirconium to the extent of 0.1% each does not markedly change the rate of solution of nitrogen-free iron into bismuth. No detectable solution of a 1020 steel crucible was found where the steel was contacted by bismuth containing zirconium at 630° C. for 48 hours. From this experiment it was found that the presence of zirconium alone on the surface of pure nitrogen-free iron is not effective in inhibiting the solution of iron in bismuth but that the presence of the zirconium nitride layer on steel can be completely effective for this purpose.

EXAMPLE IX

A sample of ZrN—ZrC solid solution was prepared and analyzed by X-ray diffraction. It was found to have unit cell dimensions intermediate between those of ZrC or ZrN. Chemical analysis indicated the ZrN content to be 22% and the ZrC content to be 78%.

The sample was irradiated in a neutron flux to a $Zr^{95}$ radioactivity of approximately $10^5$ counts per minute per milligram.

One half gram of this material was held at the bottom of a graphite crucible and 350 grams of hydrogen-purified bismuth were vacuum filtered into the crucible.

Filtered samples of the liquid metal were taken after equilibrium under a number of conditions of temperature, time and additions of ingredients.

*Table I.—Log of experiment to measure reaction between radioactive ZrC and liquid bismuth solutions*

| Step | Added | Equilibration Time (hrs.) | Temp., ° C. | Activity in 10 Gram Sample, c./m.[2] |
|---|---|---|---|---|
| 1 | 350 g. Bi—½ g. radioactive ZrC. | 24 | 550 | None |
| 2 | 500 p. p. m. Mg to above [1] | 24 | 550 | None |
| 3 | 500 p. p. m. U to above [1] | 72 | 550 | 26 |
| 4 | no change | 96 | 550 | 19 |
| 5 | 1,000 p. p. m. more U added to above.[1] | 48 | 550 | 90 |
| 6 | 61 gms. Pb added to above | 24 | 550 | 66 |
| 7 | 500 p. p. m. Zr to above [1] | 72 | 550 | 70 |
| 8 | Raised Temp. to 725° C | 24 | 725 | 50 |
| 9 | Raised Temp. to 825° C | 24 | 825 | 40 |
| 10 | no change | 48 | 825 | 40 |

[1] P. p. m.=parts per million.
[2] C./m.=counts/minute.

The complete inertness of ZrC—ZrN mixtures to liquid bismuth and lead-bismuth alloys was demonstrated by the fact that no radioactive zirconium was found in the liquid phase. The slight activity noted is attributable to the uranium in the sample.

EXAMPLE X

After the crucibles and liquid metals as described with reference to Example VIII, had equilibrated at the maximum temperature, the temperature was lowered to 425° C. and the liquid metals again sampled periodically as the system equilibrated to this lower temperature. From pure bismuth, the iron was found to precipitate nearly as rapidly as the temperature was lowered.

The following example illustrates the capability of the zirconium additives to inhibit the precipitation of metal from solution in contrast to the precipitation found in Example X. The procedure of Example X was followed in this example.

EXAMPLE XI

Additions of zirconium and magnesium to the extent of 0.1% each to a bismuth solution in an iron crucible stabilized the liquid metal composition at a supersaturation of 2.0 for more than 48 hours at 445° C.

Zirconium and magnesium addition of 0.1% each to a bismuth solution in a 5% chromium steel crucible at 610° C. stabilized the separation of solute from the solution at approximately 3.0 times normal solubility for more than 24 hours at about 425° C.

In a similar experiment in a 12% chrominum steel crucible, in which large amounts of chromium were present in the liquid metal, a supersaturation of chromium in bismuth of approximately 2.5 for 24 hours was observed.

It was found that addition of magnesium alone does not stabilize these supersaturated solutions.

EXAMPLE XII

A rod of pure iron containing 0.00008% nitrogen was immersed into purified bismuth containing 0.3% zirconium at 760° for 115 hours. The sample was examined metal-lographically and visually and found to be badly corroded. X-ray refraction studies indicated that no surface deposit was formed.

Where the mechanism of attack of the liquid metal on container metals is one of solution, the extent to which attack can be inhibited depends on the extent to which the soluble components of the container are dissolved and precipitated and the extent to which these components are present in the container metal. It has been found that in a system for circulating the liquid metals through a higher temperature and a lower temperature region, mass transfer may be substantially completely eliminated where the solubility ratio due to the temperature gradient does not exceed the measured supersaturation. The solubility ratio in this case is the ratio of the solubility of the container metal in the higher temperature region of the system to the solubility of the metal in the lower temperature region of the system. The supersaturation is the extent to which the container metal remains in the liquid phase in contact with the inhibited surface over that which is found in the absence of such surface in the cold region of the system.

Circulation systems in which bismuth, containing zirconium and magnesium additives, are circulated through a high and low temperature region differing in temperature by 50° C. have been operated for a period which is greater than 10 times the life of a similar circulation system having no inhibited surface. It has further been observed that in systems operated at higher temperature differentials where the rate of mass transfer normally is great, the rate gradually decreases with time where the protective nitride is employed. In general some inhibition to the attack of any container metal by a liquid metal composition occurs when an adherent zirconium, hafnium or titanium nitride layer is formed on the surface of the metal in that the rate or extent of solution or attack of the metal is restricted.

Adequate protection is afforded an iron base container metal for a particular high temperature heat transfer or similar usage where the principal constituent is a structural metal having a melting point in excess of 1000° C. and where this constituent is soluble in the liquid metal at the maximum temperature of usage to an extent of less than 0.1%. In such case, sufficient protection is afforded to permit use of this metal continuously over an extended time interval in a heat transfer or heat generation system.

Protection can also be afforded against attack by hot heavy liquid metals over an extended period of time to any high melting structural iron base alloy which has a composition such that no constituent is present in excess of 2% which has a solubility in the liquid metal or more than 0.5% at the maximum temperature of the system.

Where substantially complete protection is to be afforded for continuous use at high temperature, the container metal should have no constituent present in excess of 1% that has a solubility in the liquid metal of more than 0.1% at the maximum temperature of the system.

From the foregoing it is apparent that the described invention provides a very effective method for inhibiting the attack of solid high melting metal by heavy low melting liquid metal and therefore provides container systems in which heavy liquid metals may be used effectively in the transfer of heat and other applications.

In forming these stable nitrides on metal surfaces, it has been found that other stable compounds sometimes form. In particular, it has been found that in the case of steel, there is a tendency for stable carbides of titanium and zirconium to form on the structural metal surface in addition to the nitrides. These compounds as well as solid solutions of nitrides and carbides of the selected metals do not interfere with the protectivity of the layer but rather they also have some protective quality toward the solid metal surfaces in reducing the attack by heavy liquid metals.

In liquid-metal solid-metal systems, and in other systems, where the tendency of the liquid to attack the solid surface is of a lesser degree, useful protection may be afforded the solid metal by formation thereon of some of the less stable nitrides and carbides, e. g., the nitrides of aluminum, columbium or vanadium. In general, the protection of a stable nitride layer depends on the adherence of the layer to the solid metal surface. A close similarity of the unit cell of the atomic structure of the protective substance to the protected substructure is beneficial to the adherence of the layer to the solids and it is therefore preferred to form protective layers having a unit cell structure closely similar to that of the solid to be protected.

Since many embodiments might be made of the present invention and since many changes might be made in the embodiment described, it is to be understood that the foregoing description is to be interpreted as illustrative only and not in a limiting sense.

We claim:

1. The method of inhibiting the corrosion of ferrous metal surfaces by heavy liquid metals at temperatures above 500° C. which comprises bringing zirconium and nitrogen into reactive contact to form on said metal surface an adherent layer of zirconium nitride having a thickness of at least 0.5 micron and thereafter maintaining zirconium dissolved in the heavy liquid metal contacting said metal surface.

2. A metal container for containing corrosive heavy liquid metals at relatively high temperatures which comprises a steel container having on the surface to be exposed to the corrosive liquid metal a protective layer of nitride of a metal selected from the group consisting of zirconium, titanium and hafnium.

3. A method of inhibiting the corrosion of metal container surfaces by corrosive liquid metal brought into contact therewith which comprises passing a nitriding agent into contact with the surface to be protected and thereafter contacting said surface with a heavy liquid metal containing a metal selected from the group consisting of zirconium, titanium and hafnium, wherein the selected metal is present to the extent of at least 0.5 part per million.

4. The method of inhibiting the corrosion of metal container surfaces by corrosive heavy liquid metals brought into contact therewith which comprises passing cracked ammonia into contact with the surface to be protected at a temperature of between 1000 and 1200° F. and thereafter contacting said surface with the corrosive liquid metal containing a metal selected from the group consisting of zirconium, titanium and hafnium, wherein the selected metal is present to the extent of at least 0.5 part per million.

5. The method of inhibiting the corrosion of metal container surfaces by corrosive liquid metal brought into contact therewith which comprises passing cracked ammonia into contact with the surface to be protected at a temperature of between 1000 and 1200° F. and thereafter contacting said surface with the liquid metal containing a metal selected from the group consisting of zirconium, titanium and hafnium wherein the selected metal is present to the extent of at least 0.5 part per million at a temperature above that at which the metal is to be later contacted by the corrosive liquid metal.

6. The method of forming a protective zirconium nitride layer on the surface of an iron base alloy which comprises contacting said alloy with a liquid bismuth solution containing zirconium dissolved to the extent of at least 0.5 part per million at a temperature above 500° C. for a period to form a layer of zirconium nitride at least 0.5 micron in thickness.

7. The method of forming a stable nitride layer on the surface of another metal which comprises introducing nitrogen into said other metal to form metal nitrides therein, the stability of which are lower than the stability of the metal nitride to be formed and thereafter contacting said surface with a metal forming a more stable nitride at an elevated temperature, said later metal being finely dispersed in a fluid carrying medium.

8. The method of forming an adherent layer of a nitride of a metal selected from the group consisting of zirconium, titanium and hafnium on the surface of a high melting structural metal which comprises introducing into the metal to be protected a concentration of nitrogen higher than the normal concentration of nitrogen in said structural metal and thereafter contacting said surface with a liquid metal carrying medium containing the selected metal dissolved therein at a temperature at which the nitrogen is available for reaction at said surface.

9. The method of forming a protective zirconium nitride layer on a metal surface having a unit cell atomic structure closely similar to that of zirconium nitride which comprises electroplating a relatively thin layer of zirconium thereon, heating to closely bond the zirconium and base metal, thereafter subjecting said plated surface to reaction with a fluid nitriding agent.

10. The method of protecting the surface of an iron base metal sheet from attack by heavy liquid metals which comprises contacting one surface of said metal to be protected with a heavy liquid metal composition containing a metal selected from the group consisting of zirconium, titanium and hafnium, contacting the opposite side of said sheet with a source of nitrogen gas and maintaining said metal element at a temperature above 500° C. to diffuse the nitrogen through said sheet and react it with the selected metal brought into contact therewith.

11. The method of inhibiting the mass transfer of container metal within a heat transfer circulation system in which a heavy liquid metal composition transfers heat from a hotter to a colder region which comprises forming on the surface contacted by the liquid metal a layer of zirconium nitride, and maintaining the temperature differential between the hotter and colder portions of said system at a value to keep the solubility ratio due to the temperature gradient below the value of the supersaturation in the cold region of the system.

12. The method of protecting an iron base metal against attack by heavy liquid metal compositions which comprises selecting an iron base metal which has no constituent, which is present in excess of 1%, soluble in the liquid metal to the extent of more than 0.1% at the maximum temperature of the system, thereafter forming a layer of zirconium nitride on said metal surface by increasing the nitrogen at said surface and reacting said nitrogen with zirconium in a liquid carrying medium to form zirconium nitride.

13. The method of inhibiting the corrosive attack of a relatively high melting solid metal surface by low melting heavy liquid metal compositions which comprises providing said solid metal with a nitrogen content above its normal nitrogen content, at least a portion of said nitrogen being in the form of nitrides of lower stability than the nitrides of zirconium, titanium and hafnium, forming on the surface of said solid metal to be contacted with said liquid compositions the nitride of at least one metal selected from the group consisting of zirconium, titanium and hafnium by bringing into contact with said solid metal a sample of said low melting composition having the selected metal dissolved therein to the extent of at least 0.5 part per million.

14. The method of continuously protecting a metal container surface against attack by heavy liquid metal solutions which comprises forming on said metal a relatively thick adherent layer of zirconium nitride at a temperature above the temperature of use by increasing the concentration of available nitrogen on the surface of said metal, contacting said surface with heavy liquid metal containing zirconium dissolved therein and thereafter maintaining in the heavy liquid metal composition in contact with said surface a concentration of at least 0.5 part per million of zirconium.

15. The method of forming an adherent protective layer of zirconium nitride on a surface of steel in which nitrogen is normally present which comprises, introducing into said steel alloy metals which form nitrides less stable than zirconium nitride to increase the concentration of nitrogen therein, and thereafter contacting said metal with a heavy liquid metal composition with zirconium dissolved therein at a concentration in excess of 0.5 part per million.

16. The method of protecting a surface of steel in which nitrogen is normally present against attack by heavy liquid metals which comprises adding to said metal a relatively large quantity of an alloy component which readily forms a nitride slightly less stable than the nitride of zirconium, and introducing into the heavy liquid metal brought into contact with said steel a quantity of metal selected grom the group consisting of hafnium, zirconium and titanium at a concentration in excess of 0.5 part per million.

17. The method of forming a protective zirconium nitride surface layer on a steel specimen which comprises increasing the nitride content of said steel and contacting the surface to be protected with a heavy liquid metal having a density of at least 5 and a melting point below 650° C., said liquid metal being saturated with zirconium.

18. The method of forming a protective zirconium nitride surface layer on a steel specimen containing nitrides less stable than zirconium which comprises contacting the surface to be protected with a heavy liquid metal having a density of at least 5 and a melting point below 650° C. and being saturated with respect to zirconium at an elevated temperature and continuously exposing the protected metal to said liquid metal at a lower temperature and maintaining a concentration of zirconium in said liquid metal of at least 0.5 part per million.

19. Apparatus for removing heat from a corrosive heavy liquid metal at relatively high temperature which comprises a container adapted to retain said corrosive liquid metal in a circulating flow path having a higher temperature region and a lower temperature region, said container being formed of steel and having on the surface to be exposed to the corrosive liquid metal a protective layer of a nitride of a metal selected from the group consisting of zirconium, titanium and hafnium and means for contacting the external portion of said container with a heat transfer medium at a point in the high temperature region.

References Cited in the file of this patent

UNITED STATES PATENTS

| 1,098,794 | Fleming | June 2, 1914 |
| 1,794,810 | Van Arkel et al. | Mar. 3, 1931 |
| 1,944,179 | Monerberg | Jan. 23, 1934 |
| 1,997,004 | Morris | Apr. 9, 1935 |
| 2,191,331 | Van Liempt | Feb. 20, 1940 |
| 2,364,292 | Holt | Dec. 5, 1944 |

FOREIGN PATENTS

| 287,156 | Great Britain | Dec. 13, 1928 |
| 314,423 | Great Britain | Aug. 27, 1930 |
| 591,793 | Great Britain | Aug. 28, 1947 |